Feb. 19, 1929.
T. A. EDISON
1,702,935
RECEIVING APPARATUS FOR RADIO AND TELEPHONE CIRCUITS
Filed Feb. 13, 1925
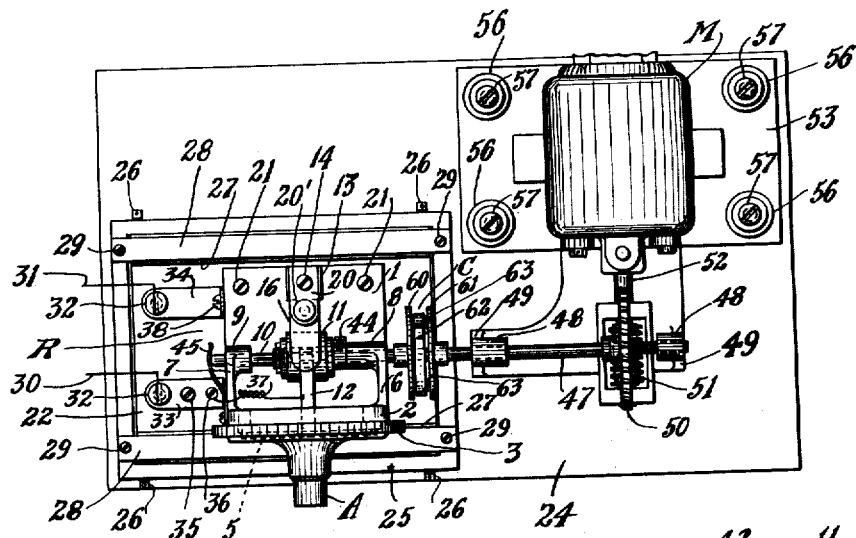
Fig. 1
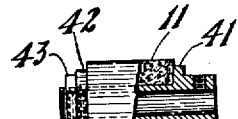
Fig. 4
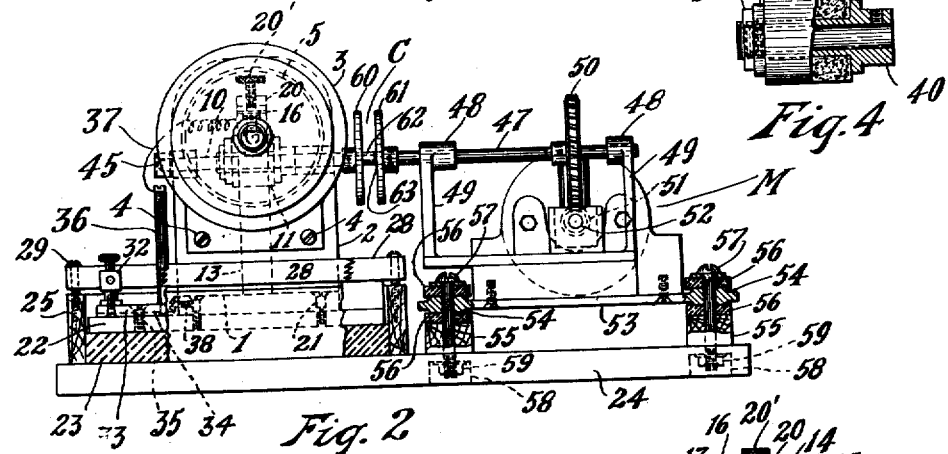
Fig. 2
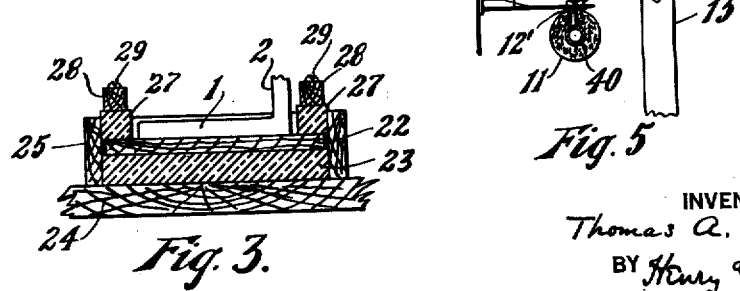
Fig. 3.
Fig. 5
INVENTOR
Thomas A. Edison
BY Henry Lanahan
ATTORNEY Patented Feb. 19, 1929.

1,702,935

UNITED STATES PATENT OFFICE.

THOMAS A. EDISON, OF LLEWELLYN PARK, NEW JERSEY, ASSIGNOR TO THOMAS A. EDISON, INCORPORATED, OF WEST ORANGE, NEW JERSEY, A CORPORATION OF NEW JERSEY.

RECEIVING APPARATUS FOR RADIO AND TELEPHONE CIRCUITS.

Application filed February 13, 1925. Serial No. 8,897.

My invention relates to receiving apparatus adapted to be disposed in the speaking or local receiving circuits of radio sets and telephone systems for converting the electrical pulsations or undulations in such circuits, which are received over the line or set up by distant transmitting apparatus, into corresponding sound pulsations or waves; and more particularly to that type of receiving apparatus described and shown in U. S. Letters Patent No. 221,957, granted to me on November 25, 1879, wherein a rotating friction wheel formed of a body of suitable finely divided non-conducting material having capillary pores is maintained in a moistened condition and a friction member such as a spring arm, bears on said wheel with a considerable pressure, said spring arm being connected to a suitable diaphragm. The receiving apparatus is connected in the speaking or local receiving circuit so that the current passes through the said spring arm and wheel and the point of frictional contact between the same, and causes the friction between such arm and wheel to vary in response to the electrical pulsations or undulations in the circuit, thereby effecting vibration of the diaphragm in conformity with such electrical pulsations.

In a receiving apparatus of the type described, the power for deflecting the diaphragm is derived from the means, usually a motor, employed for driving the friction wheel. As indicated above, the variations in the force applied to deflect the diaphragm, resulting in the vibration of the latter, are produced by variations in the amount of friction between the friction wheel and the spring arm in contact therewith. These variations in friction I believe to be produced by osmotic action as follows: When current passes through the receiving circuit including the friction spring arm and the moistened friction wheel or cylinder, in one direction, the moisture in the wheel or cylinder, under osmotic action, accumulates at the point of contact between the said spring arm and wheel; whereas, when current is passed through the circuit in the other direction, osmotic action drives the moisture in the wheel or cylinder away from said point of contact. It will be apparent that the more moisture present at the point of contact or engagement of the spring arm with the wheel, the less will be the friction at this point and vice versa. Variations or pulsations in the current flowing in the circuit, regardless of the direction of flow, produce corresponding and equally rapid variations in the effect of osmotic action and therefore in the amount of moisture and friction, at the point of contact of the spring arm and wheel. Accordingly, the vibrations set up in the diaphragm will correspond to the electrical variations or pulsations in the circuit of the receiving apparatus. Because the receiving apparatus appears to be dependent upon osmotic action, as just described, I have designated the same by the term "osmophone."

One of the objects of my invention is to provide an improved receiving apparatus of this character which will be extremely sensitive to very weak current in the receiving or speaking circuit and wherein the reproduction obtained will be greatly superior in quality to the reproduction heretofore obtainable with similar apparatus.

Another object of my invention is to provide an improved apparatus of this character especially designed to be used in place of the usual phones, loud speakers, etc., in radio receiving sets, which will effectively amplify the effects of the audio frequency current pulsations set up in the speaking circuits of such sets.

A further object of my invention is to provide an apparatus of this character, an improved construction and arrangement whereby the quality of the audible reproduction will be practically unaffected either by the hum and vibrations of the motor used to drive the friction wheel or cylinder or by shocks, jars, vibrations, etc. occurring in the neighborhood of the apparatus.

My invention also resides in an improved form of friction wheel or roller, preferably formed of light calcined oxide of magnesium, for apparatus of this character, and improvements in the mountings for such wheels and in the manner of producing the same.

Other objects and features of my invention will be hereinafter more fully described and claimed.

For a clearer understanding of my invention, attention is directed to the drawing accompanying and forming a part of this specification, and in which:

Figure 1 is a plan view of a receiving apparatus in accordance with my invention;

Fig. 2 is a view in front elevation, partly in section, of the apparatus as shown in Fig. 1;

Fig. 3 is an enlarged detailed sectional view of the mounting for the receiver;

Fig. 4 is an enlarged view in elevation, partly in section, of the friction wheel or cylinder and the mounting therefor, employed in the apparatus shown in Figs. 1 and 2; and Fig. 5 is an enlarged view in elevation, partly in section, of the friction wheel or cylinder, the friction spring arm engaging the same and the means for adjusting the pressure with which said arm engages the wheel.

Referring to the drawing, the apparatus as shown consists of a receiving device R and a motor M for rotating the friction wheel of the receiving device. The receiving device has a suitable supporting frame consisting of a base portion 1 and a standard 2. A diaphragm casing or sound box 3 is secured to the standard 2 of the frame by screws 4, 4, said casing or sound box having a diaphragm 5 secured therein in a conventional manner and being provided with a hollow outstanding shouldered neck A to which a horn or like amplifying device is adapted to be applied. Reference characters 6 and 7 represent spaced arms extending rearwardly from the standard 2 and preferably formed integrally therewith, these arms being provided at their inner or rear ends with aligned bearings 8 and 9. A shaft 10 is journaled in the bearings 8 and 9 and has suitably secured thereto between said bearings a friction wheel or cylinder 11 molded from a suitable finely divided non-conducting porous material. A friction member 12 preferably in the form of a spring arm formed of conductive metal, is suitably secured at one end to the center of the diaphragm 5 and the free end thereof is provided with a portion 12' formed of palladium or platinum, preferably the former, resting or bearing on the surface of the friction wheel 11. The base portion 1 of the supporting frame is provided rearwardly of the friction wheel 11 with a standard 13 to the upper end of which is secured, as by means of a screw 14 and a member 15, a spring arm 16. The arm 16 extends forwardly over the friction wheel 11 and is provided adjacent its free end and on the under side thereof with a bearing piece 17 having a V-shaped recess or seat, said bearing piece being opposed to a like bearing piece 18 secured to the free end portion of the spring friction arm 12 at a point on the upper side thereof opposite the palladium bearing portion 12'. Reference character 19 represents a member formed of hard insulating material, preferably ivory, which is disposed between the arms 12 and 16 and has flat tapered ends or knife edges respectively engaging the V-shaped recesses or seats in the bearing pieces 17 and 18. The member 15 has a lateral extension 20 spaced slightly from the spring arm 16 and through which a screw 20' having a knurled head is threaded. The lower end of screw 20' is adapted to contact the spring arm 16, and it is obvious that the pressure with which the friction arm 12 engages the surface of the friction wheel 11 may be readily regulated by properly adjusting this screw.

The supporting frame of the receiving device R is preferably formed of conductive metal and is secured, as by means of screws 21, to a base 22 preferably formed of wood or other suitable non-conducting material. In order to prevent shocks, jars, vibrations, etc. occurring in the neighborhood of the receiving device being communicated thereto and impairing the quality of the reproduction obtained, the base 22 for the receiving device is supported on a mounting having all parts thereof which engage the base formed of suitable resilient rubber-like material, preferably sponge rubber. As shown, the base 22 rests on a large rectangular piece or mass 23 of sponge rubber which is mounted on a suitable support 24 and is held in proper position on said support by means of a wooden rectangular frame 25 which is secured to the support 24 by brackets 26. Two thick elongated members 27 of sponge rubber are also disposed within the frame 25 above the base 22 and engage the latter adjacent the front and rear of the supporting frame of the receiving device. Two wooden bars 28 respectively engage the upper faces of the sponge rubber members 27 and are adjustably secured to the ends of the frame 25 by means of screws 29. It will be apparent that the rigidity under which the receiving device and its supporting frame are held between the sponge rubber masses 23 and 27, or in other words, the effective resiliency of the mounting for the receiving device, may be regulated by adjustment of the screws 29.

The receiving device R is connected in the radio speaking circuit or the local receiving circuit by the two leads 30 and 31 which are respectively connected by binding posts 32 to two conducting members 33 and 34, the conducting member 33 being secured by a screw 35 to the base 22 and being provided with an upstanding conducting rod 36 which is electrically connected to the spring friction arm 12 by means of a lead 37 and the conducting member 34 being connected by a screw 38 to the base portion 1 of the conducting frame of the receiving device. The conducting member 33 is spaced from the base portion 1 of the frame of the receiving device so as not to be in electrical contact therewith. The friction wheel 11 is mounted with a tight fit on the reduced portion of a shouldered sleeve or hollow mandrel 40 and is firmly held thereon between the shoulder 41 and a washer 42 by means of a nut 43, the said sleeve or mandrel 40 being secured to the shaft 10 by a set screw 44. The shaft 10 is mounted in its bearings 8 and 9 so as to be capable of longitudinal movement, but is yieldingly held against such movement with the sleeve or mandrel 40 in engagement with the bearing 8 as by means of a spring 45 secured at one end to the frame of the receiving device and having its free end engaging the end of the shaft 10 which extends outwardly from the bearing 9. The other end of shaft 10 extends outwardly from the bearing 8 and is connected through a flexible coupling C with a motor driven shaft 47, the said shaft 47 being rotatably mounted in aligned bearings 48 formed at the upper ends of standards 49 with which an extension of the frame of motor M is provided. The shaft 47 is designed to be slowly rotated by the motor M through worm gearing comprising a worm wheel 50 and a worm 51, which are respectively secured to the shaft 47 and the motor shaft 52. The motor frame is suitably secured to a rectangular base 53 having adjacent its corners flattened enlargements 54. The motor M is carried by the support or base 24 on which the receiving device R is mounted, and to further insure against the receiving device being affected by the hum and vibrations of the motor, the latter is supported from said base 24 by yieldable resilient mounting means. As shown, this mounting means comprises wooden blocks 55 resting on the support or base 24 and pairs of thick soft rubber washers 56 respectively mounted on the blocks 55 and between which the enlargements 54 of the motor base 53 are positioned. Bolts 57 extending through the enlarged portions 54 of the base 53 and the corresponding washers 56 and blocks 55, also extend through the support 24 into recesses 58 formed in the under side of said support, and serve to secure the motor and its resilient mounting means to said support. Suitable washers are provided between the heads of the bolts 57 and the upper rubber washers 56 and also between the nuts 59 threaded on the lower ends of the bolts and the bottoms of the recesses 58. The flexible coupling C is of conventional form and comprises spaced discs 60 and 61 secured to the adjacent ends of the shafts 10 and 47, a suitable flexible member 62 such as a leather strip extending transversely of the disc 60 and secured by pins to said disc, and spaced pins 63 extending from the disc 61 and arranged to engage the flexible strip 62 on opposite sides and adjacent the ends thereof. This flexible coupling further serves to prevent the transmission of the motor hum and vibrations to the receiving device and also renders it unnecessary to carefully align the shaft 47 with the shaft 10 carrying the friction wheel 11.

The path of the current through the receiving device R is as follows: From one side 30 of the radio speaking circuit or local receiving circuit through one binding post 32, conducting member 33, rod 36, lead 37, friction arm 12, and the palladium contact piece 12′, to the friction wheel 11, then through wheel 11, mandrel 40, shaft 10, the conducting frame of the receiving device, screw 38, conducting member 34 and the other binding post 32 back to the other side 31 of the circuit. As indicated above, the motor M is operatively connected through the worm gearing 50 and 51, shaft 47 and coupling C, to the shaft 10 so as to rotate the latter and the friction wheel 11 secured thereto at a slow rate. When the friction wheel 11 is thus rotated and the pressure of the arm 12 thereon has been properly adjusted by manipulation of the screw 20′ the diaphragm 5 will, under what I believe to be the effects of osmotic action, be rapidly vibrated in accordance with the current pulsations or variations in the radio speaking circuit or local receiving circuit containing the leads or conductors 30 and 31, in the manner hereinbefore described. Such vibration of the diaphragm 5 will of course result in an audible reproduction, which, if desired, may be further amplified by a horn mounted on the neck A of the diaphragm casing or sound box 3.

I have found that the efficiency and sensitiveness of the receiving device and the quality of the reproduction thereof depend to a great extent on the construction of the friction wheel 11 and the material of which it is formed. It is important that the friction wheel be made as hard as practicable and be provided with an exceedingly smooth tracking surface in order to prevent wearing thereof and of the palladium bearing portion 12′ of the spring friction arm 12 engaging the same. It is also very important that this wheel be true and that it be mounted so as to turn with no eccentricity. I have conducted numerous experiments and have found magnesium oxide to be the material which is preferable for the friction wheel. I have also found that it is preferable to make the wheel of that form of magnesium oxide commonly known as light calcined magnesium oxide. In making and mounting the friction wheel I preferably proceed as follows: A mass of light calcined oxide of magnesium is first molded into the form of a cylinder somewhat larger in diameter than that of the finished wheel, under high pressure, preferably under a pressure varying from about 6,000 to 10,000 pounds per square inch according to the current to be used in the circuit in which the receiving device is to be connected. This cylinder is then bored axially and its ends are faced off. The cylinder is now mounted with a close fit on the sleeve or mandrel 40 referred to above, and is firmly secured to the mandrel against the shoulder 41 by means of the washer 42 and nut 43, as explained above, after which it is turned down true to the desired diameter, preferably to a diameter of five-eighths of an inch. The mandrel with the wheel thereon is then put in a lathe and the cylindrical surface of the wheel is provided centrally thereof with a smooth polished track by holding a smoothing wheel thereagainst under a considerable pressure while the mandrel is rapidly rotated. The mandrel 40 and wheel 11 are then removed from the lathe and potassium hydrate is incorporated with the material of the wheel, or at least with the material of the surface portion of the wheel, as by immersing the wheel in an approximately twenty per cent (20%) solution of potassium hydrate for a period of from five to seven seconds and then drying the same for about one-half hour. The mandrel 40 with the friction wheel 11 thereon, is then mounted in the receiving device R on the shaft 10, which closely fits the opening in the mandrel, and is secured to said shaft by the set screw 44 in such position that the palladium bearing portion 12' on the end of the arm 12 will engage the smooth polished track formed on the cylindrical surface of the friction wheel.

The receiving apparatus constructed and arranged as described above is very sensitive to weak currents and will greatly amplify the effects of the variations or pulsations in such currents. I have found where hardly any results are obtainable with the use of the ordinary ear-phones in radio receiving sets, a loud reproduction can be obtained when my improved receiving apparatus is used. Moreover, such reproduction is clear and of good quality, and by reason of the special mountings for the motor and receiving device and the flexible coupling between the latter, the reproduction is practically unaffected either by the motor hum and vibration or by other extraneous shocks, jars, vibrations, etc. It is important that the friction wheel 11 be maintained in a moist condition so that the apparatus will properly operate, and to insure this it is merely necessary to dispose a vessel containing water or a wet sponge in the vicinity of the wheel.

While I have specifically described a preferred embodiment of my improved receiving apparatus, and the method of forming and mounting the friction wheel thereof, it is to be understood that the same are subject to numerous changes and modifications without depature from the spirit of the invention or the scope of the appended claims.

Having now described my invention, what I claim as new and desire to protect by Letters Patent is as follows:

1. Means for converting electrical variations into corresponding mechanical movements comprising a member having a frictionally engaging surface of magnesium oxide, substantially as described.

2. Means for converting electrical variations into corresponding mechanical movements comprising a member having a frictionally engaging surface of light, calcined magnesium oxide, substantially as described.

3. Means for converting electrical variations into corresponding mechanical movements cooperating friction members mounted for relative movement, one of which members is formed of magnesium oxide and is adapted to conduct electric current, substantially as described.

4. A wheel adapted for inclusion in an electric circuit and for frictional engagement with another member, said wheel comprising a molded mass of magnesium oxide and having potassium hydrate incorporated with the material thereof, substantially as described.

5. A wheel adapted for inclusion in an electric circuit and for frictional engagement with another member, said wheel having a frictionally engaging surface portion of magnesium oxide with which potassium hydrate is incorporated, substantially as described.

6. A wheel adapted for inclusion in an electric circuit and for frictional engagement with another member, said wheel comprising a mass of magnesium oxide molded under a high pressure, potassium hydrate being incorporated with the material of the surface portion of said wheel, said wheel having a polished cylindrical frictionally engaging surface, substantially as described.

7. A wheel adapted for inclusion in an electric circuit and for frictional engagement with another member, said wheel comprising a mass of magnesium oxide molded into cylindrical form under a pressure of several thousand pounds per square inch, potassium hydrate being incorporated with the material of the surface portion of said wheel and the cylindrical surface of the wheel being turned true and polished, substantially as described.

8. The method of producing a friction wheel for apparatus of the character described, which consists in molding a mass of magnesium oxide in cylindrical form, then immersing the cylinder in a substantially 20% solution of potassium hydrate for a period of substantially five to seven seconds, and then drying the cylinder, substantially as described.

9. In apparatus of the character described, a vibratory member, a movable friction member formed of magnesium oxide and a member connected to said vibratory member and bearing on said movable friction member, substantially as described.

10. In apparatus of the character described, a vibratory member, a rotary member formed of magnesium oxide and a member connected to said vibratory member and having a portion formed of palladium bearing on said rotary member, substantially as described.

11. In apparatus of the character described, vibratory means, a movable friction member formed of magnesium oxide and maintained in a moistened condition, the surface portion of said member having potassium hydrate incorporated therein, and a member connected to said vibratory member and bearing on the surface of said movable friction member, substantially as described.

12. In apparatus of the character described, a vibratory member, a movable friction member formed of magnesium oxide, a member connected to said vibratory member and bearing on said movable friction member, and means for regulating the pressure with which the member connected to the vibratory member bears on said movable friction member, substantially as described.

13. Means for converting electrical variations into corresponding mechanical movements comprising co-operating friction members mounted for relative movement, one of which members comprises a mass of magnesium oxide molded under a pressure of from about 6,000 to about 10,000 pounds per square inch and is adapted to conduct electric current, substantially as described.

14. The method of producing a friction wheel for apparatus of the character described which consists in molding a mass of magnesium oxide in cylindrical form under a pressure of from about 6,000 to about 10,000 pounds per square inch, incorporating potassium hydrate with the magnesium oxide of which the cylinder is formed, then drying the cylinder, turning the cylinder true and polishing the cylindrical surface thereof, substantially as described.

This specification signed this 2nd day of February, 1925.

THOS. A. EDISON.

CERTIFICATE OF CORRECTION.

Patent No. 1,702,935.          Granted February 19, 1929, to

THOMAS A. EDISON.

It is hereby certified that error appears in the printed specification of the above numbered patent requiring correction as follows: Page 1, line 74, for the word "current" read "currents"; page 4, line 89, claim 3, before "cooperating" insert the word "comprising"; and that the said Letters Patent should be read with these corrections therein that the same may conform to the record of the case in the Patent Office.

Signed and sealed this 11th day of June, A. D. 1929.

(Seal)

M. J. Moore,
Acting Commissioner of Patents.

magnesium oxide in cylindrical form, then immersing the cylinder in a substantially 20% solution of potassium hydrate for a period of substantially five to seven seconds, and then drying the cylinder, substantially as described.

9. In apparatus of the character described, a vibratory member, a movable friction member formed of magnesium oxide and a member connected to said vibratory member and bearing on said movable friction member, substantially as described.

10. In apparatus of the character described, a vibratory member, a rotary member formed of magnesium oxide and a member connected to said vibratory member and having a portion formed of palladium bearing on said rotary member, substantially as described.

11. In apparatus of the character described, vibratory means, a movable friction member formed of magnesium oxide and maintained in a moistened condition, the surface portion of said member having potassium hydrate incorporated therein, and a member connected to said vibratory member and bearing on the surface of said movable friction member, substantially as described.

12. In apparatus of the character described, a vibratory member, a movable friction member formed of magnesium oxide, a member connected to said vibratory member and bearing on said movable friction member, and means for regulating the pressure with which the member connected to the vibratory member bears on said movable friction member, substantially as described.

13. Means for converting electrical variations into corresponding mechanical movements comprising co-operating friction members mounted for relative movement, one of which members comprises a mass of magnesium oxide molded under a pressure of from about 6,000 to about 10,000 pounds per square inch and is adapted to conduct electric current, substantially as described.

14. The method of producing a friction wheel for apparatus of the character described which consists in molding a mass of magnesium oxide in cylindrical form under a pressure of from about 6,000 to about 10,000 pounds per square inch, incorporating potassium hydrate with the magnesium oxide of which the cylinder is formed, then drying the cylinder, turning the cylinder true and polishing the cylindrical surface thereof, substantially as described.

This specification signed this 2nd day of February, 1925.

THOS. A. EDISON.

CERTIFICATE OF CORRECTION.

Patent No. 1,702,935.  Granted February 19, 1929, to

THOMAS A. EDISON.

It is hereby certified that error appears in the printed specification of the above numbered patent requiring correction as follows: Page 1, line 74, for the word "current" read "currents"; page 4, line 89, claim 3, before "cooperating" insert the word "comprising"; and that the said Letters Patent should be read with these corrections therein that the same may conform to the record of the case in the Patent Office.

Signed and sealed this 11th day of June, A. D. 1929.

(Seal)

M. J. Moore,
Acting Commissioner of Patents.